(12) United States Patent
Kim et al.

(10) Patent No.: US 11,630,239 B2
(45) Date of Patent: Apr. 18, 2023

(54) POLYESTER FILM AND FLEXIBLE DISPLAY APPARATUS COMPRISING SAME

(71) Applicant: SKC CO., LTD., Gyeonggi-do (KR)

(72) Inventors: Gun Uk Kim, Gyeonggi-do (KR); Sang Min Choi, Gyeonggi-do (KR); Young Min Heo, Gyeonggi-do (KR)

(73) Assignee: SKC CO., LTD., Seoul (KR)

( * ) Notice: Subject to any disclaimer, the term of this patent is extended or adjusted under 35 U.S.C. 154(b) by 207 days.

(21) Appl. No.: 17/071,104

(22) Filed: Oct. 15, 2020

(65) Prior Publication Data
US 2021/0124090 A1    Apr. 29, 2021

(30) Foreign Application Priority Data
Oct. 28, 2019 (KR) .................. 10-2019-0134720

(51) Int. Cl.
| G02B 1/04 | (2006.01) |
| G02B 1/14 | (2015.01) |
| G09F 9/30 | (2006.01) |
| B32B 27/36 | (2006.01) |
| G06F 1/16 | (2006.01) |

(52) U.S. Cl.
CPC ............... G02B 1/04 (2013.01); B32B 27/36 (2013.01); G02B 1/14 (2015.01); G06F 1/1652 (2013.01); G09F 9/301 (2013.01); B32B 2367/00 (2013.01); B32B 2457/206 (2013.01)

(58) Field of Classification Search
None
See application file for complete search history.

(56) References Cited

U.S. PATENT DOCUMENTS

| 2009/0127741 | A1 | 5/2009 | Kurouji et al. |
| 2016/0185926 | A1* | 6/2016 | Song ................. C08J 7/0427 |
| | | | 428/447 |
| 2017/0325336 | A1* | 11/2017 | Shibata ................. H05K 3/284 |
| 2017/0363779 | A1* | 12/2017 | Lee ....................... G02B 5/3025 |
| 2020/0353733 | A1 | 11/2020 | Kim et al. |

FOREIGN PATENT DOCUMENTS

| CN | 111909404 A | 11/2020 |
| JP | 2000-202904 A | 7/2000 |
| KR | 10-2017-0109746 | 10/2017 |

(Continued)

OTHER PUBLICATIONS

Office Action issued by the Japanese Patent Office dated Nov. 9, 2021.

(Continued)

*Primary Examiner* — Anthony J Frost
(74) *Attorney, Agent, or Firm* — IP & T Group LLP (57) ABSTRACT

The polyester film according to an embodiment has a coefficient of determination ($R^2$) of the strain with respect to stress and a crystallinity adjusted to specific ranges, whereby it is possible to achieve the flexibility that does not cause deformation even when a certain stress is sustained for a long period of time and the resistant characteristics to the impact of external pressing. Accordingly, the polyester film can be applied to a cover of a flexible display device, in particular, a foldable display device to exhibit excellent characteristics.

11 Claims, 5 Drawing Sheets

(56) References Cited

FOREIGN PATENT DOCUMENTS

KR       20160033608     * 10/2017
WO     2006-132244 A1    12/2006

OTHER PUBLICATIONS

Office Action issued by the Japanese Patent Office dated Apr. 26, 2022.
Office Action for the Chinese Patent Application No. 202011172422.9 issued by the Chinese Patent Office dated Nov. 23, 2022.

* cited by examiner

ND FLEXIBLE
POLYESTER FILM AND FLEXIBLE DISPLAY APPARATUS COMPRISING SAME

The present application claims priority of Korean patent application numbers 10-2019-0134720 filed on Oct. 28, 2019. The disclosure of each of the foregoing applications is incorporated herein by reference in its entirety.

TECHNICAL FIELD

Embodiments relate to a polyester film in which the flexibility and appearance characteristics are adjusted, and a flexible display device comprising the same.

BACKGROUND ART

Display technologies continue to develop driven by the demand in tandem with the development of IT devices. Technologies on curved displays and bent displays have already been commercialized. In recent years, flexible display devices that can be flexibly bent or folded in response to an external force are preferred in the field of mobile devices that require large screens and portability at the same time. In particular, a foldable display device has the great advantages that it is folded to a small size to enhance its portability when not in use, and it is unfolded to form a large screen when used.

These flexible display devices mainly use a transparent polyimide film or ultra-thin glass (UTG) as a cover window. Transparent polyimide is vulnerable to scratches from the outside. Ultra-thin glass has a problem in that the scattering prevention characteristics are poor; therefore, a protective film is applied to the surface thereof. In a film applied to a foldable display device, tensile stress continues to be applied to the film in a folded state. If the film is deformed in this state, the layers may be delaminated from each other.

In order to prevent the above problem, a polymer film made of a soft material that does not easily deform even when a certain stress is applied for a long period of time may be used as a protective film (see Korean Laid-open Patent Publication No. 2017-0109746). However, there arise problems in that a soft material polymer has sticky characteristics, which makes the process control difficult, it is difficult to prepare a flawless transparent film due to the presence of gels, resulting in a feeling of heterogeneity with the cover window, it is difficult to prepare a thin film, and it is readily deformed by an external impact such as pressing.

DISCLOSURE OF INVENTION

Technical Problem

In recent years, a film made of a polyester material such as polyethylene terephthalate (PET) has been considered as a protective film applied to a cover of a flexible display device. However, it is necessary to solve the problem of poor elastic restoring, that is, the flexibility required for foldable display applications.

Meanwhile, if a polyester film is modified to simply increase the flexibility, dent marks may be readily formed on the film due to foreign matter or external force in the film production or product use, resulting in appearance defects.

As a result of research conducted by the present inventors, it has been discovered that the flexibility and appearance characteristics can the simultaneously enhanced by adjusting the strain with respect to stress and the crystallinity of a polyester film to specific ranges.

Accordingly, an object of the embodiments is to provide a polyester film with suppressed deformation even after a plurality of folding and external pressing, a laminate of the same and a transparent cover, and a flexible display device comprising the same.

Solution to Problem

According to an embodiment, there is provided a polyester film having a coefficient of determination ($R^2$) of 0.985 or more in the section in which the strain is 2% to 3% in the stress-strain curve and having a crystallinity of 55% or more.

According to another embodiment, there is provided a laminate, which comprises a transparent cover for a flexible display device; and a polyester film disposed on the transparent cover, wherein the polyester film has a coefficient of determination ($R^2$) of 0.985 or more in the section in which the strain is 2% to 3% in the stress-strain curve and has a crystallinity of 55% or more.

According to still another embodiment, there is provided a flexible display device, which comprises a flexible display panel; and a polyester film disposed on the flexible display panel, wherein the polyester film has a coefficient of determination ($R^2$) of 0.985 or more in the section in Which the strain is 2% to 3% in the stress-strain curve and has a crystallinity of 55% or more.

Advantageous Effects of Invention

According to the embodiments, the coefficient of determination ($R^2$) of the strain with respect to stress and the crystallinity of a polyester film are adjusted to specific ranges, whereby it is possible to achieve the flexibility that does not cause deformation even when a certain stress is sustained for a long period of time and the resistant characteristics to the impact of external pressing.

Thus, it is possible to maintain the original characteristics when the polyester film is applied to a cover of a flexible display device and subjected to a plurality of repeated folding and to prevent a deterioration in the appearance characteristics due to various factors while the product is being used.

In addition, the polyester film can be readily prepared as a thin film and may have transparency in which a sense of heterogeneity with a cover window for a display is not felt.

Accordingly, the polyester film can be applied to a cover window of a flexible display device, in particular, a foldable display device.

EXPLANATION OF REFERENCE NUMERALS

1: in-folding type flexible display device
2: out-folding type flexible display device 10: organic light emitting display device
100: protective film
200: cover window
300: flexible display panel
310: front polarizing plate
320: organic light emitting display panel
a, b: folding points

BEST MODE FOR CARRYING OUT THE INVENTION

In the following description of the embodiments, in the case where an element is mentioned to be formed "on" or "under" another element, it means not only that one element is directly formed "on" or "under" another element, but also that one element is indirectly formed on or under another element with other element(s) interposed between them.

For the sake of description, the sizes of individual elements in the appended drawings may be exaggeratedly depicted, and they may differ from the actual sizes.

Throughout the present specification, when a part is referred to as "comprising" an element, it is understood that other elements may be comprised, rather than other elements are excluded, unless specifically stated otherwise.

In addition, all numbers expressing the physical properties, dimensions, and the like of elements used herein are to be understood as being modified by the term "about" unless otherwise indicated.

In the present specification, a singular expression is understood to encompass a singular or plural expression, interpreted in context, unless otherwise specified.

Polyester Film

The polyester film according to an embodiment has a coefficient of determination ($R^2$) of 0.985 or more in the section in which the strain is 2% to 3% in the stress-strain curve and has a crystallinity of 55% or more.

Coefficient of Determination of Strain with Respect to Stress

When the polyester film is stretched in an arbitrary direction, the coefficient of determination ($R^2$) of the strain (i.e., tensile strain) with respect to stress in the specific strain section has a specific value. Thus, it is possible to maintain the original characteristics when the polyester film is applied to a cover of a flexible display device and subjected to a plurality of repeated folding.

In this specification, the coefficient of determination is a well-known statistical term as a measure of the fitness of a regression equation. In a regression analysis, it indicates the proportion of the sum of variance to the total sum of variance of $y_i$ for the data $y_i$ of the dependent variable Y. The coefficient of determination is generally expressed as $R^2$. The closer to 1 the value, the higher the degree of fit of the regression equation.

As an example, the polyester film may have a coefficient of determination ($R^2$) of 0.985 or more, 0.986 or more, and 0.987 or more, 0.988 or more, or 0.989 or more in first and second directions perpendicular to each other in the plane, respectively, in the section in which the strain is 2% to 3% in the stress-strain curve. Specifically, the polyester film may have a coefficient of determination ($R^2$) of 0.985 to 0.995, 0.986 to 0.995, 0.987 to 0.995, or 0.985 to 0.990, in the first and second directions, respectively, in the section in which the strain is 2% to 3% in the stress-strain curve.

As another example, the polyester film may have a coefficient of determination ($R^2$) of 0.990 or more in the section in which the strain is 0% to 2% in the stress-strain curve. For example, the polyester film may have a coefficient of determination ($R^2$) of 0.991 or more, 0.992 or more, 0.993 or more, 0.994 or more, or 0.995 or more, in the first and second directions, respectively, in the section in which the strain is 0% to 2%. Specifically, the polyester film may have a coefficient of determination ($R^2$) of 0.991 to 0.999, 0.992 to 0.999, 0.993 to 0.999, 0.994 to 0.999, or 0.995 to 0.999, in the first and second directions, respectively, in the section in which the strain is 0% to 2%.

As still another example, the polyester film may have a ratio (S4/S2) of the stress (S4) at a strain of 4% to the stress (S2) at a strain of 2% in the stress-strain curve of 1.1 or more, 1.2 or more, 1.25 or more, or 1.3 or more. Specifically, the polyester film may have a ratio (S4/S2) of the stress (S4) at a strain of 4% to the stress (S2) at a strain of 2% in the stress-strain curve of 1.1 to 1.7, 1.2 to 1.5, 1.25 to 1.5, or 1.3 to 1.5. As still another example, the polyester film may have a difference between the stress at a strain of 2% and the stress at a strain of 4% in the stress-strain curve of 5 MPa or more, 10 MPa or more, or 1.5 MPa or more. Specifically, the polyester film may have a difference between the stress at a strain of 2% and the stress at a strain of 4% in the stress-strain curve of 10 MPa or more. More specifically, the polyester film may have a difference between the stress at a strain of 2% and the stress at a strain of 4% in the stress-strain curve of 10 MPa to 50 MPa or 10 MPa to 30 MPa.

As still another example, the polyester film may have a stress at a strain of 4% in the stress-strain curve of 50 MPa or more, 60 MPa or more, or 65 MPa or more. Specifically, the polyester film may have a stress at a strain of 4% in the stress-strain curve of 65 MPa to 85 MPa. More specifically, the polyester film may have a stress at a strain of 4% in the stress-strain curve of 65 MPa to 75 MPa, 75 MPa to 85 MPa, or 70 MPa to 80 MPa.

As still another example, the polyester film may have a strain for a stress of 80 MPa in the stress-strain curve of 15% or less, 10% or less, or 8% or less. Specifically, the polyester film may have a strain for a stress of 80 MPa in the stress-strain curve of 3% to 8%. More specifically, the polyester film may have a strain for a stress of 80 MPa in the stress-strain curve of 3% to 6%, 4% to 8%, or 4% to 7%.

The first direction may be any direction in the plane of the polyester film, and the second direction may be determined in a direction in the plane perpendicular to the first direction. For example, the first direction may be the longitudinal direction (i.e., machine direction; MD) or the transverse direction (tenter direction; TD) of the film, and the second direction may be the transverse direction (TD) or the longitudinal direction (MD) perpendicular thereto. Specifically, the first direction may be the longitudinal direction (MD) of the film, and the second direction may be the transverse direction (TD) of the film.

Figure 1:
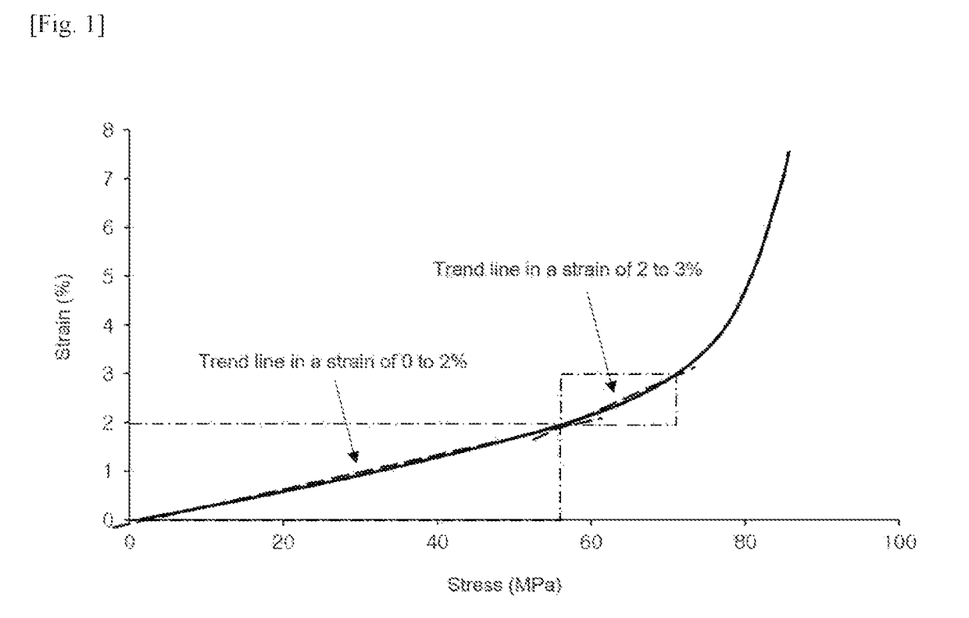
FIG. 1 shows a curve of the strain with respect to stress of a polyester film and a trend line applied thereto.

FIG. 1 shows a curve of the strain with respect to stress of a polyester film and a trend line applied thereto. If a trend line is drawn for the section in which the strain is 0% to 2% in this curve, the coefficient of determination ($R^2$) for this section may be obtained. If a trend line is drawn for the section in which the strain is 2% to 3% in this curve, the coefficient of determination ($R^2$) for this section may be obtained.

Figure 2A:
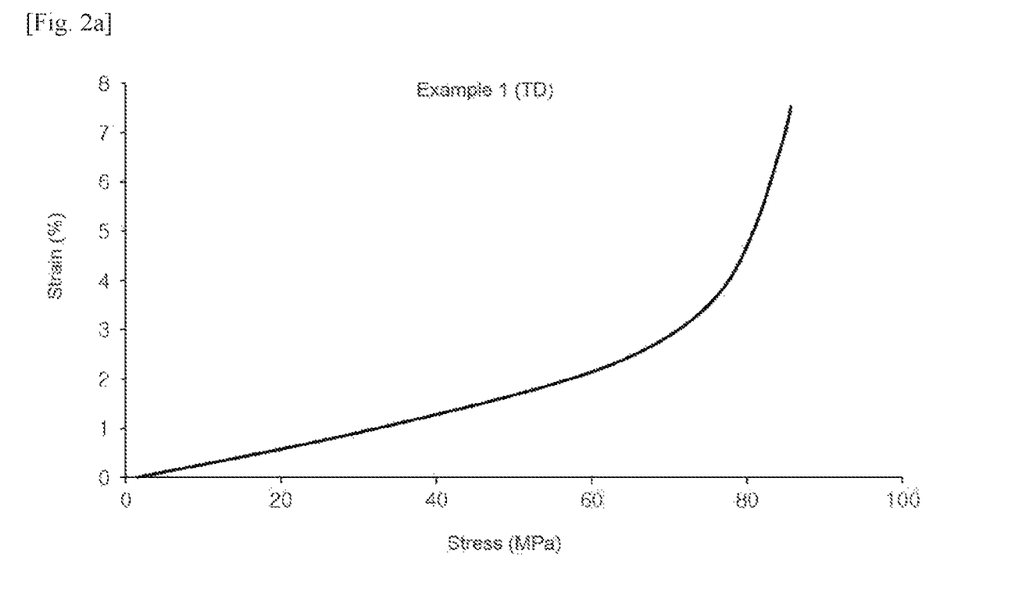
FIGS. 2a, 3a, and 4a show curves of the strain with respect stress of the polyester film of Example 1, the sections of a strain of 0% to 2% and 2% to 3%, respectively.
Figure 2B:
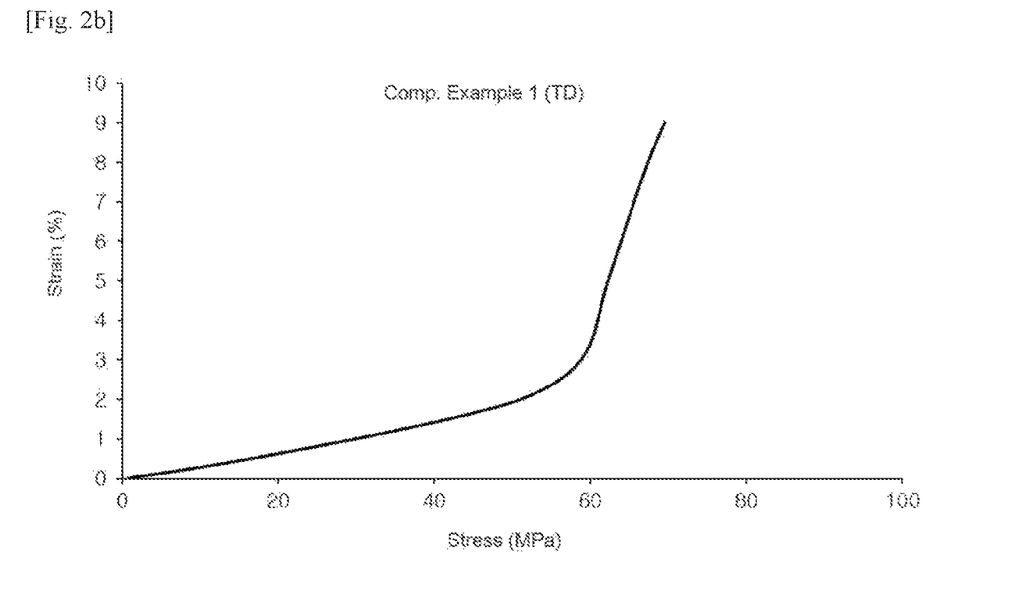
FIGS. 2b, 3b, and 4b show curves of the strain with respect stress of the polyester film of Comparative Example 1, the sections of a strain of 0% to 2% and 2% to 3%, respectively.
Figure 3A:
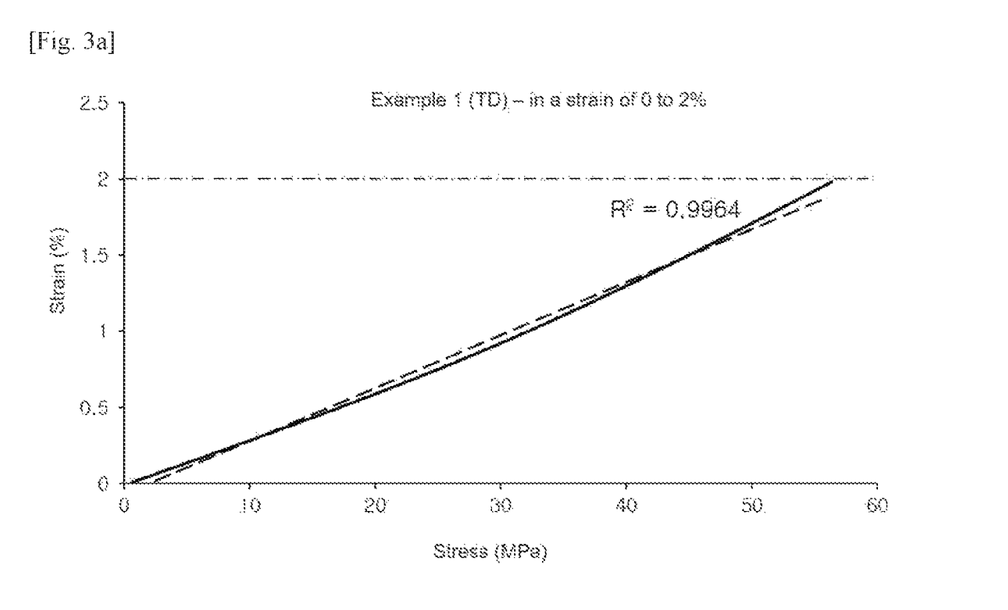
Figure 3B:
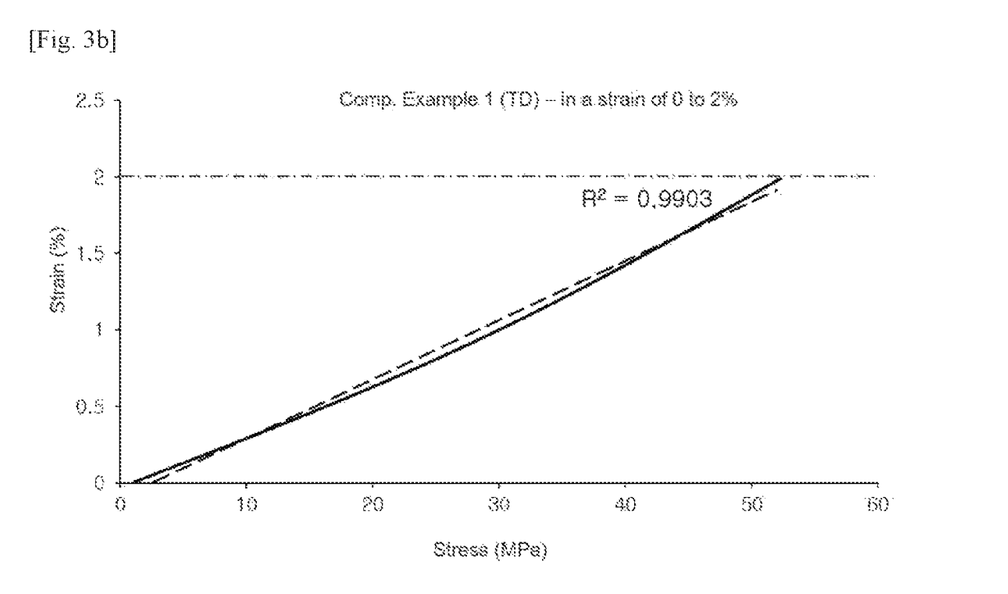
Figure 4A:
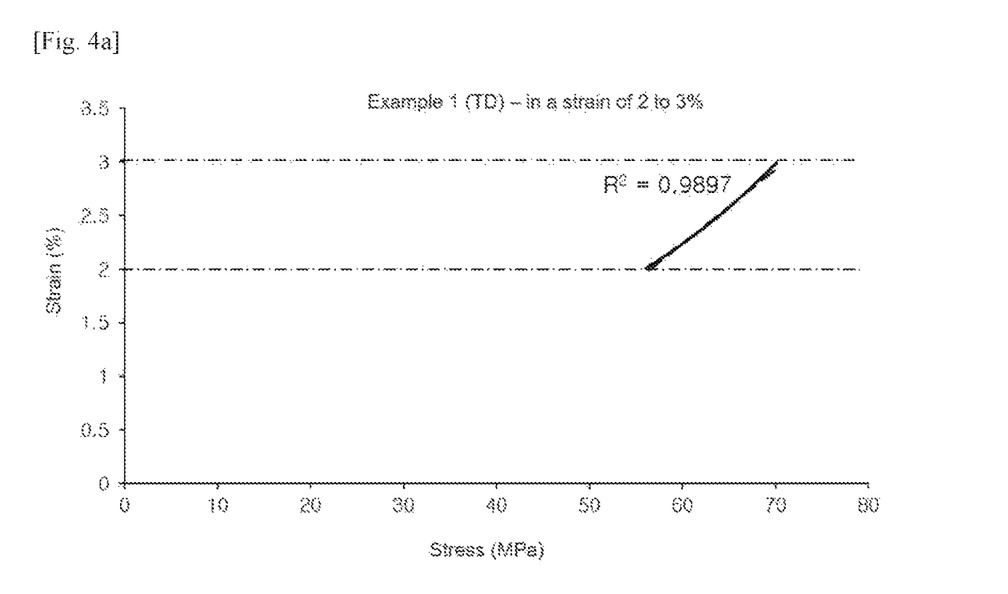
Figure 4B:
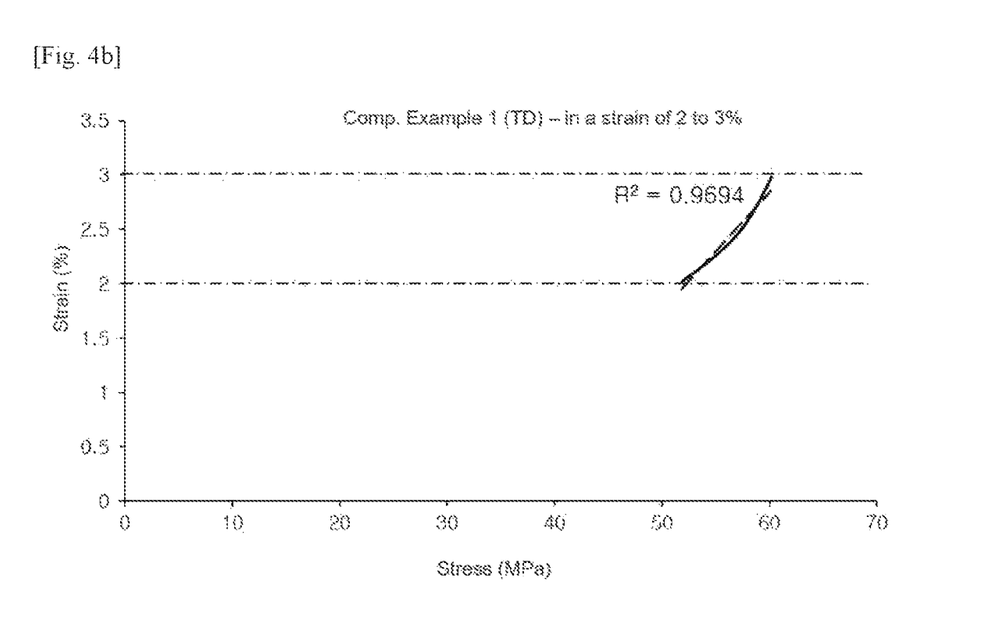

FIGS. 2a, 3a, and 4a show curves of the strain with respect to stress of the polyester film of the Example, the sections of a strain of 0% to 2% and 2% to 3%, respectively. In addition, FIGS. 2b, 3b, and 4b show curves of the strain with respect to stress of the polyester film of the Comparative Example, the sections of a strain of 0% to 2% and 2% to 3%, respectively. As can be seen from the drawings, the polyester film of the Example has a coefficient of determination ($R^2$) of the strain with respect to stress of 0.985 or more in the section in which the strain is 2% to 3% and a coefficient of determination ($R^2$) of the strain with respect to stress of 0.990 or more in the section in which the strain is 0% to 2%, whereas the polyester film of the Comparative Example does not meet these tensile characteristics.

Retardation of the Film

The polyester film may have an in-plane retardation (Ro) of 1,200 nm or less, 1,000 nm or less, 600 nm or less, 500 nm or less, 400 nm or less, 300 nm or less, or 200 nm or less. Within the above preferred range, it is possible to minimize the occurrence of rainbow stains.

Meanwhile, the lower limit of the in-plane retardation of the polyester film may be 0 nm. Alternatively, the lower limit of the in-plane retardation (Ro) may be 10 nm or more, 30 nm or more, or 50 nm or more in order to balance the optical characteristics and the mechanical properties.

In addition, the polyester film may have a thickness direction retardation (Rth) of 5,000 nm or more or 6,000 nm or more. The thickness direction retardation may be a value measured based on a thickness of 40 μm to 50 μm. Within the above preferred range, the crystallization of the polyester film is minimized, which is preferable from the viewpoint of mechanical properties. In addition, as the thickness direction retardation (Rth) is larger, the ratio (Rth/Ro) of the thickness direction retardation (Rth) to the in-plane retardation (Ro) becomes larger, thereby effectively suppressing rainbow stains.

Meanwhile, the upper limit of the thickness direction retardation (Rth) may be 16,000 nm or less, 15,000 nm or less, or 14,000 nm or less in view of the thickness limit and cost for eliminating rainbow stains in the polyester film.

Here, the in-plane retardation (Ro) is a parameter defined by a product ($\Delta n_{xy} \times d$) of anisotropy ($\Delta n_{xy} = |n_x - n_y|$) of refractive indices of two mutually perpendicular axes on a film and the film thickness (d), which is a measure of the degree of optical isotropy and anisotropy.

In addition, the thickness direction retardation is a parameter defined by a product of an average of the two birefringences $\Delta n_{xz}$ ($= |n_x - n_z|$) and $\Delta n_{yz}$ ($= |n_y - n_z|$) observed on a cross-section in the film thickness direction and the film thickness (d).

In addition, the polyester film may have a ratio (Rth/Ro) of the thickness direction retardation (Rth) to the in-plane retardation (Ro) of 10 or more, 15 or more, or or more. The smaller the in-plane retardation (Ro) and the larger the thickness direction retardation (Rth), the more advantageous for preventing rainbow stains. Thus, it is preferable that the ratio (Rth/Ro) of the two values is maintained to be larger.

Film Composition

The polyester film comprises a polyester resin.

The polyester resin may be a homopolymer resin or a copolymer resin in which a dicarboxylic acid and a diol are polycondensed. In addition, the polyester resin may be a blend resin in which the homopolymer resins or the copolymer resins are mixed.

Examples of the dicarboxylic acid include terephthalic acid, isophthalic acid, orthophthalic acid, 2,5-naphthalene dicarboxylic acid, 2,6-naphthalene dicarboxylic acid, 1,4-naphthalene dicarboxylic acid, 1,5-naphthalene dicarboxylic acid, diphenylcarboxylic acid, diphenoxyethane dicarboxylic acid, diphenylsulfone carboxylic acid, anthracenedicarboxylic acid, 1,3-cyclopentanedicarboxylic acid, 1,3-cyclohexanedicarboxylic acid, 1,4-cyclohexanedicarboxylic acid, hexahydroterephthalic acid, hexahydroisophthalic acid, malonic acid, dimethyl malonic acid, succinic acid, 3,3-diethyl succinic acid, glutaric acid, 2,2-dimethylglutaric acid, adipic acid, 2-methyladipic acid, trimethyladipic acid, pimelic acid, azelaic acid, sebacic acid, suberic acid, dodecadicarboxylic acid, and the like.

In addition, examples of the diol include ethylene glycol, propylene glycol, hexamethylene glycol, neopentyl glycol, 1,2-cyclohexanedimethanol, 1,4-cyclohexanedimethanol, decamethylene glycol, 1,3-propanediol, 1,4-butanediol, 1,5-pentanediol, 1,6-hexanediol, 2,2-bis(4-hydroxyphenyl)propane, bis(4-hydroxyphenyl) sulfone, and the like.

Preferably, the polyester resin may be an aromatic polyester resin having excellent crystallinity. For example, it may have a polyethylene terephthalate (PET) resin as a main component.

As an example, the polyester film may comprise a polyester resin, specifically a PET resin, in an amount of at least about 85% by weight, more specifically at least 90% by weight, at least 95% by weight, or at least 99% by weight. As another example, the polyester film may further comprise a polyester resin other than the PET resin. Specifically, the polyester film may further comprise up to about 15% by weight of a polyethylene naphthalate (PEN) resin. More specifically, the polyester film may further comprise a PEN resin in an amount of about 0.1% by weight to 10% by weight or about 0.1% by weight to 5% by weight.

The polyester film having the above composition can have increased crystallinity and enhanced mechanical properties in terms of tensile strength and the like in the process of preparing the same through heating, stretching, and the like.

Characteristics and Use of the Film

The polyester film may have a thickness of 10 μm to 500 μm. Alternatively, the thickness of the polyester film may be 10 μm to 300 μm, 10 μm to 100 μm, 10 μm to 80 μm, 20 μm to 60 μm, or 40 μm to 60 μm.

The polyester film is preferably a biaxially stretched film from the viewpoint of flexibility and elastic restoring. In such event, the ratio between the respective stretching ratios for the two directions may be 1:0.5 to 1:1.5, 1:0.7 to 1:1.3, or 1:0.8 to 1:1.2. Specifically, the polyester film may be biaxially stretched, and the ratio between the respective stretching ratios in the two directions may be 1:0.8 to 1:1.2. If the ratio of stretching ratios is within the above range, it may be more advantageous for having flexibility in which deformation does not occur even if a certain stress is maintained for a long period of time.

The polyester film may be biaxially stretched in a first direction and in a second direction perpendicular to the first direction in the plane. In such event, the stretching ratio in the first direction may be 2.0 to 5.0, specifically 2.8 to 3.5 or 3.3 to 3.5. In addition, the stretching ratio in the second direction may be 2.0 to 5.0, specifically 2.9 to 4.5 or 3.3 to 4.0. Specifically, the polyester film may be biaxially stretched at a stretching ratio of 3.3 to 3.5 in the longitudinal direction and at a stretching ratio of 3.3 to 4.0 in the transverse direction. In addition, the ratio (d2/d1) of the stretching ratio in the second direction (d2) to the stretching ratio in the first direction (d1) may be 1.2 or less. For example, it may be 1.0 to 1.2, 1.0 to 1.1, 1.0 to 1.15, or 1.05 to 1.1.

In addition, the polyester film may have a crystallinity of 55% or more, and further 60% or more. Specifically, the crystallinity of the polyester film may be 55% to 70%, 55% to 65%, or 60% to 70%. If the crystallinity is within the above range, it is possible to maintain excellent appearance by suppressing dent marks that may be formed on the film due to foreign matter or external force in the film production or product use.

In addition, the polyester film is preferably subjected to thermal treatment from the viewpoint of mechanical properties. For example, the polyester film may be subjected to thermal treatment at a temperature of 180° C. or higher, specifically 195° C. or higher, more specifically 195° C. to 230° C. If the thermal treatment is carried out within the above temperature range, it may be more advantageous for achieving the characteristics to suppress deformation caused by external pressing.

In addition, the polyester film may withstand 100 times or more, 1,000 times or more, 10,000 times or more, 50,000 times or more, 100,000 times or more, 150,000 times or more, or 200,000 times or more of repeated folding until it is deformed. Specifically, the polyester film may withstand 200,000 times or more of repeated folding until it is deformed. Within the above preferred range, it can be advantageously applied to a flexible display device since it is not deformed even upon frequent folding.

The protective film can be applied to a cover of a flexible display device, in particular, a foldable display device by virtue of these characteristics. It is possible to prevent a deterioration in the original characteristics by the deformation occurring at the point of small inward folding in an in-folding type, as well as by the deformation occurring at the point of large outward folding in an out-folding type.

Process for Preparing a Polyester Film

Such a polyester film may be prepared by a process comprising biaxial stretching at an adjusted stretching ratio and thermal treatment at a specific temperature.

The process for preparing a polyester film comprises forming a sheet from a polyester resin and biaxially stretching and thermally treating it to obtain a film, wherein the polyester film has a coefficient of determination ($R^2$) of 0.985 or more in the section in which the strain is 2% to 3% in the stress-strain curve and has a crystallinity of 55% or more.

Here, the composition and process conditions are adjusted such that the polyester film finally produced by the above process satisfies the above characteristics (i.e., tensile characteristics and crystallinity).

Specifically, in order for the final polyester film to satisfy the above characteristics, the extrusion and casting temperatures of the polyester resin are adjusted, the preheating temperature at the time of stretching, the stretching ratio in each direction, the stretching temperature, the transferring speed, and the like are adjusted, or thermal treatment and relaxation is carried out after stretching while the thermal treatment temperature and relaxation rate are adjusted.

Hereinafter, each step will be described in more detail.

First, a polyester resin is extruded to form an unstretched sheet. In such event, the composition of the polyester resin is as described above.

In addition, the extrusion may be carried out at a temperature of 230° C. to 300° C. or 250° C. to 280° C.

The unstretched sheet may be preheated at a certain temperature before stretching thereof.

The preheating temperature may be determined to satisfy the range of Tg+5° C. to Tg+50° C. based on the glass transition temperature (Tg) of the polyester resin. As an example, it may be in the range of 70° C. to 100° C. Within the above range, the sheet may be soft enough to be readily stretched, and it is possible to effectively prevent the phenomenon of breakage during stretching thereof as well.

The stretching is carried out by biaxial stretching. For example, it may be biaxially stretched in the longitudinal direction (or machine direction; MD) and in the transverse direction (or tenter direction; TD) through a simultaneous biaxial stretching method or a sequential biaxial stretching method. Preferably, it may be carried out by a sequential biaxial stretching method in which stretching is first performed in one direction and then stretching is performed in the direction perpendicular thereto.

The stretching speed may be 6.5 m/min to 8.5 m/min, but it is not particularly limited thereto.

The stretching ratio in the longitudinal direction may be 2.0 to 5.0, specifically 2.8 to 3.5 or 3.3 to 3.5. In addition, the stretching ratio in the transverse direction may be 2.0 to 5.0, specifically 2.9 to 4.5 or 3.3 to 4.0. Within the above preferred range, it may be more advantageous for obtaining a uniform thickness. In addition, in order to balance the longitudinal direction (MD) and the width direction (TD), it is preferable to adjust the load applied in each direction during stretching, while measuring the refractive index, so that the difference in the refractive index in each direction is minimized. In addition, the ratio (d2/d1) of the stretching ratio in the transverse direction (d2) to the stretching ratio in the longitudinal direction (d1) may be 1.2 or less. For example, it may be 1.0 to 1.2, 1.0 to 1.1, 1.0 to 1.15, or 1.05 to 1.1. The stretch ratios (d1 and d2) refer to the ratios that represent the length after stretching as compared with the length before stretching, which is 1.0.

The film obtained through the stretching is then subjected to thermal treatment. The thermal treatment may be carried out at a temperature of 180° C. or higher, specifically 195° C. or higher, more specifically 195° C. to 230° C. The thermal treatment may be carried out for 0.2 minute to 1 minute, more specifically for 0.4 minute to 0.7 minute.

In addition, after the thermal treatment is initiated, the film may be relaxed in the longitudinal direction and/or in the transverse direction, and the temperature range therefor may be 150° C. to 250° C. The relaxation may be carried out at a relaxation rate of 1% to 10%, 2% to 7%, or 3% to 5%. In addition, the relaxation may be carried out for 1 second to 1 minute, 2 seconds to 30 seconds, or 3 seconds to 10 seconds.

In addition, the film may be cooled after the thermal treatment. The cooling may be carried out under a temperature condition lower than the thermal treatment temperature by 50° C. to 150° C.

Laminate

The laminate according to one embodiment comprises a transparent cover for a flexible display device; and a polyester film according to the embodiment disposed on the transparent cover.

The polyester film in the laminate has substantially the same configuration and properties as those of the polyester film according to the embodiment as described above.

The transparent cover may be a cover window of a flexible display device.

The transparent cover may be a polymer film or a glass substrate. Specifically, the transparent cover may be a polyimide-based film or ultra-thin glass (UTG).

As an example, the transparent cover may comprise a polyimide resin. Specifically, the transparent cover may be a polyimide-based film. The polyimide-based film comprises a polyimide-based polymer, which is prepared by polymerizing a diamine compound, a dianhydride compound, and, optionally, a dicarbonyl compound.

The polyimide-based polymer is a polymer that contains an imide repeat unit. In addition, the polyimide-based polymer may optionally comprise an amide repeat unit. The polyimide-based polymer may be prepared by simultaneously or sequentially reacting reactants that comprise a diamine compound and a dianhydride compound. Specifically, the polyimide-based polymer is prepared by polymerizing a diamine compound and a dianhydride compound. Alternatively, the polyimide-based polymer is prepared by polymerizing a diamine compound, a dianhydride compound, and a dicarbonyl compound. Here, the polyimide-based polymer comprises an imide repeat unit derived from the polymerization of the diamine compound and the dianhydride compound and an amide repeat unit derived from the polymerization of the diamine compound and the dicarbonyl compound.

The diamine compound may be, for example, an aromatic diamine compound that contains an aromatic structure. Specifically, the diamine compound may comprise 2,2'-bis(trifluoromethyl)-4,4'-diaminobiphenyl (TFDB), but it is not limited thereto.

The dianhydride compound may be, for example, an aromatic dianhydride compound that contains an aromatic structure or an alicyclic dianhydride compound that contains an alicyclic structure. Specifically, the dianhydride compound may comprise 2,2'-bis-(3,4-dicarboxyphenyl) hexafluoropropane dianhydride (6FDA), but it not limited thereto.

The dicarbonyl compound may be an aromatic dicarbonyl compound that contains an aromatic structure. The dicarbonyl compound may comprise terephthaloyl chloride (TPC), 1,1'-biphenyl-4,4'-dicarbonyl dichloride (BPDC), isophthaloyl chloride (IPC), or a combination thereof. But it is not limited thereto.

The diamine compound and the dianhydride compound may be polymerized to form a polyamic acid. Subsequently, the polyamic acid may be converted to a polyimide through a dehydration reaction, and the polyimide comprises an imide repeat unit.

For example, the polyimide may comprise a repeat unit represented by the following Formula A-1, but it is not limited thereto.

[Formula A-1]

In Formula A-1, n is, for example, an integer of 1 to 400.

In addition, the diamine compound and the dicarbonyl compound may be polymerized to form a repeat unit represented by the following Formula B.

For example, the diamine compound and the dicarbonyl compound may be polymerized to form amide repeat units represented by the following Formulae B-1 to B-3.

[Formula B-1]

In Formula B-1, x is, for example, an integer of 1 to 400.

[Formula B-2]

In Formula B-2, y is, for example, an integer of 1 to 400.

[Formula B-3]

In Formula B-3, y is, for example, an integer of 1 to 400.

The thickness of the transparent cover may be 20 μm to 500 μm, 30 μm to 300 μm, or 40 μm to 100 μm.

The transparent cover may have a surface hardness of HB or higher and a light transmittance of 80% or higher at a wavelength of 550 nm. In addition, the transparent cover may have a yellowness of 5 or less and a haze of 2% or less based on a thickness of 50 μm.

The laminate may withstand 100 times or more, 1,000 times or more, 10,000 times or more, 50,000 times or more, 100,000 times or more, 150,000 times or more, or 200,000 times or more of repeated folding until it is delaminated. Within the above range, it can be advantageously applied to a flexible display device since it is not delaminated even upon frequent folding.

Specifically, the transparent cover may be a polyimide-based film or ultra-thin glass (UTG), and the laminate may withstand 200,000 times or more of repeated folding until it is delaminated.

The laminate can be applied to a cover of a flexible display device, in particular a foldable display device, by virtue of these characteristics. It is possible to prevent a deterioration in the characteristics by the deformation occurring at the point of small inward folding in an in-folding type, as well as by the deformation occurring at the point of large outward folding in an out-folding type.

Display Device

The flexible display device according to an embodiment comprises a polyester film according to the embodiment on a cover.

Specifically, the flexible display device comprises a flexible display panel; and a polyester film according to the embodiment disposed on the flexible display panel.

Alternatively, the flexible display device comprises a flexible display panel; and a laminate (i.e., a laminate of a transparent cover and a polyester film) according to the embodiment disposed on the flexible display panel.

The polyester film or the laminate in the flexible display device has substantially the same configuration and properties as those of the polyester film or the laminate according to the embodiments as described above.

The flexible display device may be a foldable display device. Specifically, the foldable display device may be an in-folding type or an out-folding type depending on the folding direction.

Figure 5A:
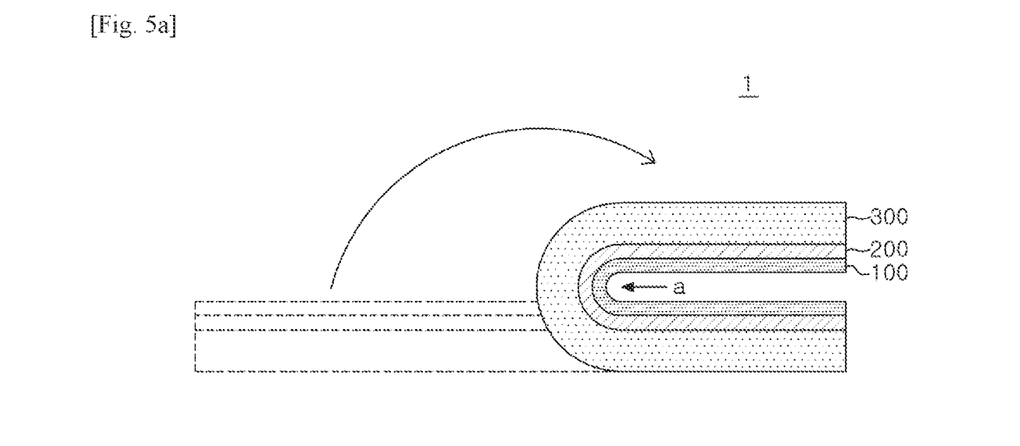
FIGS. 5a and 5b are cross-sectional views of an in-folding type and out-folding type flexible display devices, respectively.
Figure 5B:
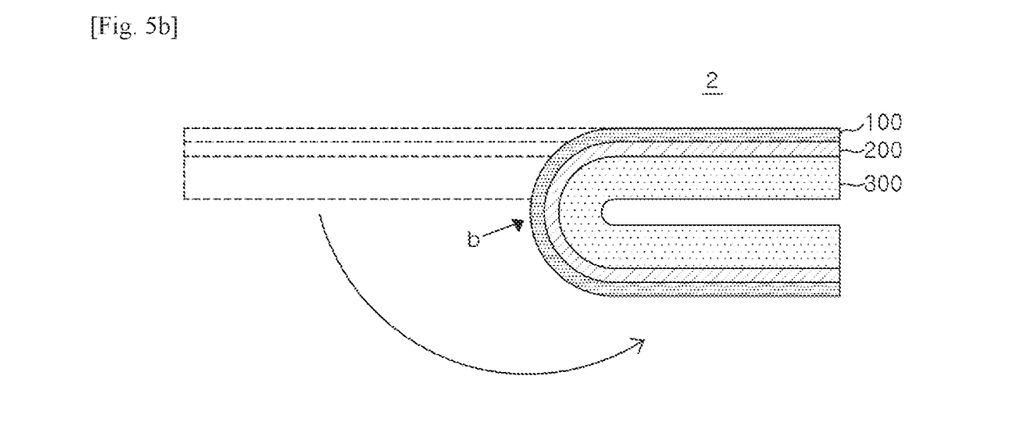

Referring to FIGS. 5a and 5b, the foldable display devices may be an in-folding type (1) in which a screen is positioned inside the folding direction and an out-folding type (2) in which a screen is positioned outside the folding direction. As a transparent cover applied as a cover window (200) of these foldable display devices, for example, a polyimide-based film, ultra-thin glass (UTG), or the like may be used. A protective film (100) is applied to the surface of the cover window (200) for the purposes of shock absorption, scattering prevention, and scratch prevention. The polyester film according to an embodiment may be used as the protective film (100).

In a material applied to flexible display devices, it is as important as flexibility that the original characteristics are not deteriorated despite frequent bending or folding. When a conventional material is completely folded and then unfolded, there remains a mark, and it is almost impossible to return to the original state. Thus, the development of materials applied to flexible display devices should be accompanied by characteristics to overcome this limitation.

Specifically, whitening or cracks are generated in the protective film (100) or the like, which deteriorates the characteristics thereof, due to the deformation caused by stress applied to the point (a) of small inward folding in the in-folding type (1) as shown in FIG. 5a and due to the deformation caused by stress applied to the point (b) of large outward folding in the out-folding type (2) as shown in FIG. 5b.

Such whitening and cracks can generally be solved when the modulus of the protective film is small at room temperature. Conventional polyester films generally have a large modulus at room temperature, so that they have the problem that whitening and cracks are easily generated when applied to flexible display devices.

However, the polyester film according to an embodiment can realize the characteristics required for a cover of a flexible display by adjusting the deformed dimension of a film in the cycle of tensioning and relaxing the film. As a result, it is possible that the polyester film according to an embodiment and the laminate comprising the same maintain the original characteristics when they are applied to a cover of a flexible display device and subjected to a plurality of repeated folding.

Figure 6:
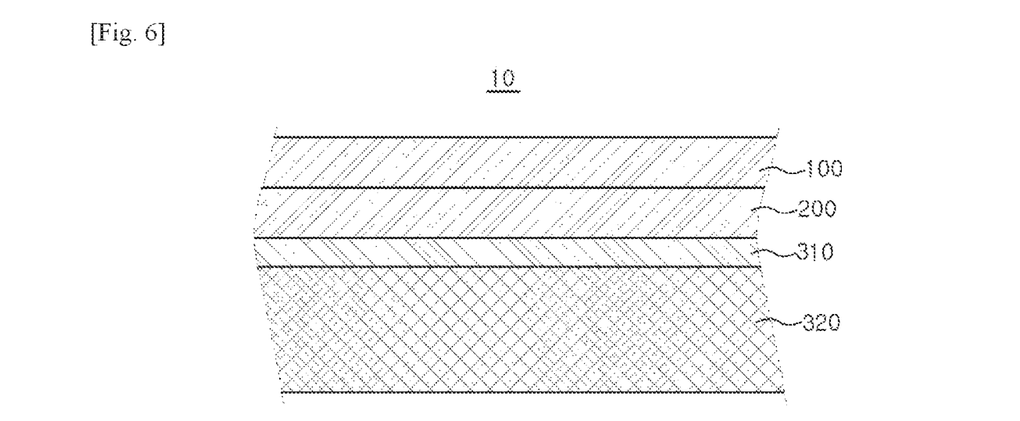
FIG. 6 shows an example of a cross-sectional view of an organic light emitting display device.

In the flexible display device, the flexible display panel may be specifically an organic light emitting display (OLED) panel. FIG. 6 schematically shows an example of a cross-sectional view of an organic light emitting display device (100), which comprises an organic light emitting display panel (320). Referring to FIG. 6, the organic light emitting display comprises a front polarizing plate (310) and an organic light emitting display panel (320). The front polarizing plate may be disposed on the front side of the organic light emitting display panel. In more detail, the front polarizing plate may be bonded to the side of the organic light emitting display panel where an image is displayed. The organic light emitting display panel displays an image by self-emission of a pixel unit. The organic light emitting display panel comprises an organic light emitting substrate and a driving substrate. The organic light emitting substrate comprises a plurality of organic light emitting units that correspond to respective pixels. The organic light emitting units each comprise a cathode, an electron transport layer, a light emitting layer, a hole transport layer, and an anode. The driving substrate is operatively coupled to the organic light emitting substrate. That is, the driving substrate may be coupled to the organic light emitting substrate so as to apply a driving signal such as a driving current. More specifically, the driving substrate may drive the organic light emitting substrate by applying a current to each of the organic light emitting units.

MODE FOR THE INVENTION

Hereinafter, the present invention will be described more specifically with reference to examples. But the scope of the present invention is not limited thereto only.

Examples 1 to 3 and Comparative Examples 1 to 5: Preparation of a Polyester Film A polyethylene terephthalate (PET) resin was extruded at about 250 to 280° C. in an extruder and cast to prepare an unstretched sheet. The unstretched sheet was preheated and stretched 3 to 4 times in the longitudinal direction (MD) and in the transverse direction (TD), respectively. The ratio between the stretching ratios in the two directions was adjusted. Thereafter, the stretched sheet was heat-set, relaxed at a relaxation rate of 3 to 5% for 3 to 10 seconds, and cooled, thereby preparing a polyester film having a thickness of 50 μm. In such event, the preheating temperature at the time of stretching, the stretching ratio in each direction, the stretching temperature, the heat-setting temperature, and the relaxation rate were adjusted as shown in Table 1 below, so that polyester films having a thickness of 50 μm were prepared.

TABLE 1

| | Preheating temp. (° C.) | MD/TD stretching ratio | Stretching temp. (° C.) | Heat-setting Temp. (° C.) | Relaxation rate (%) |
|---|---|---|---|---|---|
| Ex. 1 | 100 | 3.3/3.35 | 140 | 230 | 3.1 |
| Ex. 2 | 100 | 3.3/3.7 | 140 | 220 | 3.1 |
| Ex. 3 | 100 | 3.5/4.0 | 140 | 220 | 3.1 |
| C. Ex. 1 | 100 | 3.3/3.35 | 140 | 180 | 4.2 |
| C. Ex. 2 | 100 | 3.3/4.0 | 140 | 220 | 3.1 |
| C. Ex. 3 | 100 | 3.3/4.2 | 140 | 220 | 3.1 |
| C. Ex. 4 | 100 | 3.5/4.3 | 140 | 220 | 3.1 |
| C. Ex. 5 | 100 | 3.5/4.4 | 140 | 220 | 3.1 |

Test Example 1: Measurement of the Coefficient of Determination (RZ) of Strain-Stress To carry out a tensile test in the longitudinal direction (MD) or transverse direction (TD) of the polyester films prepared above, they were cut into the following size to obtain specimens. They were then measured for a strain with respect to stress under the following conditions using a universal testing machine (UTM).

Specimen length: 50 mm (initial dimension in the tensile direction)
Specimen width: 15 mm (initial dimension in the direction perpendicular to the tensile direction)
Specimen thickness: 50 μm
Measurement temperature: room temperature
Tensile speed: 50 mm/min
Tensile direction: longitudinal direction (MD) or transverse direction (TD)

A stress-strain curve for each specimen was obtained under the above condition. A trend line was applied to the sections in which the strain was 0 to 2% and 2 to 3% to obtain a coefficient of determination ($R^2$) from the curve using the Microsoft Excel program (See FIG. 1).

The results are shown in the Table below.

TABLE 2

| | Strain section | $R^2$ value MD | $R^2$ value TD | Crystallinity (%) |
|---|---|---|---|---|
| Ex. 1 | 0 to 2% | 0.9966 | 0.9964 | 59 |
| | 2 to 3% | 0.9891 | 0.9897 | |
| Ex. 2 | 0 to 2% | 0.9910 | 0.9924 | 61 |
| | 2 to 3% | 0.9867 | 0.9877 | |
| Ex. 3 | 0 to 2% | 0.9931 | 0.9910 | 57 |
| | 2 to 3% | 0.9861 | 0.9859 | |
| C. Ex. 1 | 0 to 2% | 0.9911 | 0.9903 | 49 |
| | 2 to 3% | 0.9711 | 0.9694 | |
| C. Ex. 2 | 0 to 2% | 0.9895 | 0.9901 | 61 |
| | 2 to 3% | 0.9621 | 0.9610 | |
| C. Ex. 3 | 0 to 2% | 0.9954 | 0.9871 | 51 |
| | 2 to 3% | 0.9893 | 0.9542 | |
| C. Ex. 4 | 0 to 2% | 0.9901 | 0.9967 | 59 |
| | 2 to 3% | 0.9722 | 0.9902 | |
| C. Ex. 5 | 0 to 2% | 0.9931 | 0.9952 | 58 |
| | 2 to 3% | 0.9863 | 0.9741 | |

Test Example 2: Measurement of Crystallinity

X-ray diffraction (XRD) analysis was carried out to measure the area (A) of the peak recognized as amorphous and the area (B) of the crystalline peak, and the ratio of the area of the crystalline peak to the area of the entire peaks (A+B) was obtained to calculate the crystallinity.

Test Example 3: Folding Test

The polyester film prepared above was laminated with a transparent polyimide film, which was then subjected to the MIT folding test according to ASTM D 2176 and TAPPI T 511 using a folding endurance tester (MIT-DA, Toyoseiki).

In order to prepare a transparent polyimide film, a 1-liter glass reactor equipped with a temperature-controllable double jacket was charged with 563.3 g of dimethylacetamide (DMAc) as an organic solvent at 20° C. under a nitrogen atmosphere. Then, 55 moles of 2,2'-bis(trifluoromethyl)-4,4'-diaminobiphenyl (TFMB) and 45 moles of 4,4'-oxydianiline (ODA) were added thereto for dissolution thereof. Thereafter, 15 moles of 2,2'-bis(3,4-dicarboxyphenyl)hexafluoropropane dianhydride (6-FDA) was slowly added thereto, followed by stirring for 2 hours. Then, 25 moles of isophthaloyl chloride (IPC) was added, followed by stirring for 2 hours. And 60 moles of terephthaloyl chloride (TPC) was added (at a molar ratio of imide to amide of 15:85), followed by stirring for 3 hours, thereby preparing a polymer solution. The polymer solution thus obtained was coated onto a glass plate and then dried with hot air at 80° C. for 30 minutes. Thereafter, the dried gel-sheet was fixed to a pin frame while it was stretched by 1.01 times in a first direction and stretched by 1.03 times in a second direction perpendicular to the first direction. Thereafter, while the dried gel-sheet was fixed to the pin frame, it was cured in an atmosphere heated at a rate of 2° C./min in a temperature range of 80° C. to 300° C. Thereafter, it was cooled to obtain a polyimide film having a thickness of 50 μm.

Thereafter, for a folding test, both sides of the polyimide film were laminated with the polyester films of the Examples and Comparative Examples prepared above through an optically transparent adhesive (OCA), thereby obtaining a laminate. The laminated was subjected to 200,000 times of repeated folding at a radius of curvature of 1.5 mm, and then it was observed whether or not delamination occurred.

Test Example 4: Evaluation of Dent Marks

The polyester film prepared above was wound on a core in the form of a roll. After a week, it was observed whether or not there were spot-shaped dent marks on the film surface while it was unwound. The results are shown in the table below.

TABLE 3

| | Delamination or not upon 200,000 times of repeated folding | | Dent marks |
|---|---|---|---|
| | MD | TD | or not |
| Ex. 1 | x | x | x |
| Ex. 2 | x | x | x |
| Ex. 3 | x | x | x |
| C. Ex. 1 | o | o | o |
| C. Ex. 2 | o | o | x |
| C. Ex. 3 | x | o | o |
| C. Ex. 4 | o | x | x |
| C. Ex. 5 | x | o | x |

As can be seen from the above Table, in the films of Examples 1 to 3, no delamination occurred in both of the longitudinal and transverse directions even upon 200,000 times of repeated folding in each direction, and no dent marks were observed on the film surface. Thus, it was confirmed that high flexibility and excellent appearance characteristics were simultaneously achieved.

In contrast, in the films of Comparative Examples 1 to 5, delamination occurred in at least one of the longitudinal and transverse directions upon 200,000 times of repeated folding, or dent marks were observed on the film surface. Thus, at least one of the flexibility and appearance characteristics were poor.

The invention claimed is:

1. A polyester film having a coefficient of determination ($R^2$) of 0.985 or more in first and second directions perpendicular to each other in a plane, respectively, in the section in which the strain is 2% to 3% in the stress-strain curve and having a crystallinity of 55% or more,
    wherein the polyester film has a difference between the stress at a strain of 2% and the stress at a strain of 4% in the stress-strain curve of 10 MPa or more.

2. The polyester film of claim 1, which has a coefficient of determination ($R^2$) of 0.990 or more in the section in which the strain is 0% to 2% in the stress-strain curve.

3. The polyester film of claim 1, which has a stress at a strain of 4% in the stress-strain curve of 65 MPa to 85 MPa.

4. The polyester film of claim 1, which has a strain for a stress of 80 MPa in the stress-strain curve of 3% to 8%.

5. The polyester film of claim 1, which is biaxially stretched, wherein the ratio between the respective stretching ratios in the two directions is 1:0.8 to 1:1.2.

6. The polyester film of claim 1, which is subjected to thermal treatment at a temperature of 195° C. or higher.

7. The polyester film of claim 1, which withstands 200,000 times or more of repeated folding until it is deformed.

8. The polyester film of claim 1, which is applied to a cover of a flexible display device.

9. A laminate, which comprises a transparent cover for a flexible display device; and a polyester film disposed on the transparent cover, wherein the polyester film has a coefficient of determination ($R^2$) of 0.985 or more in first and second directions perpendicular to each other in a plane, respectively, in the section in which the strain is 2% to 3% in the stress-strain curve and has a crystallinity of 55% or more, wherein the polyester film has a difference between the stress at a strain of 2% and the stress at a strain of 4% in the stress-strain curve of 10 MPa or more.

10. The laminate of claim 9, wherein the transparent cover is a polyimide-based film or ultra-thin glass (UTG), and the laminate withstands 200,000 times or more of repeated folding until it is delaminated.

11. A flexible display device, which comprises a flexible display panel; and a polyester film disposed on the flexible display panel, wherein the polyester film has a coefficient of determination ($R^2$) of 0.985 or more in first and second directions perpendicular to each other in a plane, respectively, in the section in which the strain is 2% to 3% in the stress-strain curve and has a crystallinity of 55% or more wherein the polyester film has a difference between the stress at a strain of 2% and the stress at a strain of 4% in the stress-strain curve of 10 MPa or more.

* * * * *